United States Patent [19]
Seitz

[11] Patent Number: 4,672,250
[45] Date of Patent: Jun. 9, 1987

[54] DRIVE MOTOR BEARING APPARATUS

[75] Inventor: John A. Seitz, Milwaukee, Wis.

[73] Assignee: A. O. Smith Corporation, Milwaukee, Wis.

[21] Appl. No.: 671,638

[22] Filed: Nov. 15, 1984

[51] Int. Cl.<sup>4</sup> ............................................. H02K 5/16
[52] U.S. Cl. .................... 310/90; 310/67 R; 384/518
[58] Field of Search .............. 310/90, 67 R, 157, 156, 310/DIG. 6, 154, 51; 384/517, 518, 563

[56] References Cited

U.S. PATENT DOCUMENTS

| 2,850,337 | 9/1958 | McCallum | 384/518 |
| 3,725,708 | 4/1973 | Possis | 310/DIG. 6 |
| 4,023,868 | 5/1977 | Miki | 384/563 |
| 4,115,715 | 9/1978 | Muller | 310/67 R |
| 4,116,506 | 9/1978 | Moritomo | 384/518 |
| 4,129,796 | 12/1978 | Pabst | 310/67 R |
| 4,471,250 | 9/1984 | Snider | 310/157 |

FOREIGN PATENT DOCUMENTS

| 3300574 | 8/1983 | Fed. Rep. of Germany | 310/90 |
| 2100367 | 12/1982 | United Kingdom | 384/518 |

Primary Examiner—R. Skudy
Attorney, Agent, or Firm—Andrus, Sceales, Starke & Sawall

[57] ABSTRACT

A disk drive motor has a mounting plate with a circuit board on one face and a cylindrical hub extending therethrough. A stator is secured to the plate and exterior of the hub. A cup-shaped rotor overlies the stator and has a rotor shaft journaled in the hub by spaced sealed precision bearings. The bearing opening includes an integral ledge which forms bearing chambers having smooth, uninterrupted walls within which a bearing is secured. Each bearing has an outer race secured within the chamber and an aligned inner race secured to the shaft, with end sealing members to seal the bearings. Spring means are located between each ledge are the inner races of the corresponding bearings to load the bearings. In assembly, the one bearing is assemblied on the shaft and inserted into the hub with the outer race adhesively bonded in place. The opposite bearing is close fitted into the opposite bearing and the shaft is pressed into the bearing during the assembly. Each of said bearings is preloaded with about 20 to 30 percent of maximum and both lubricates the bearing and reduces operational bearing noise.

3 Claims, 4 Drawing Figures

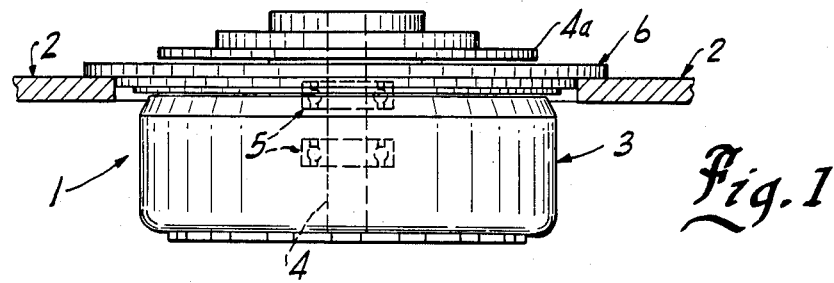
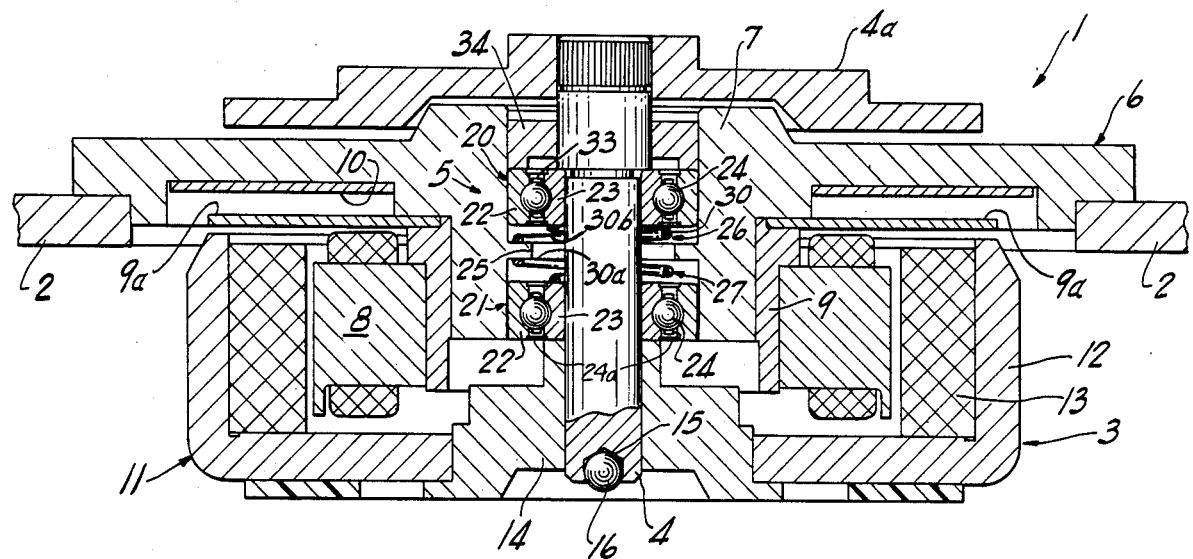
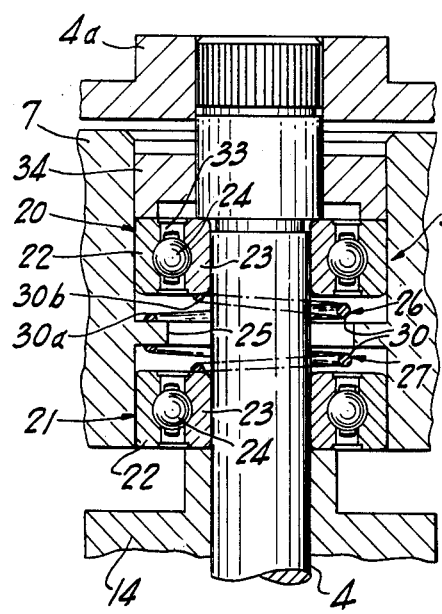
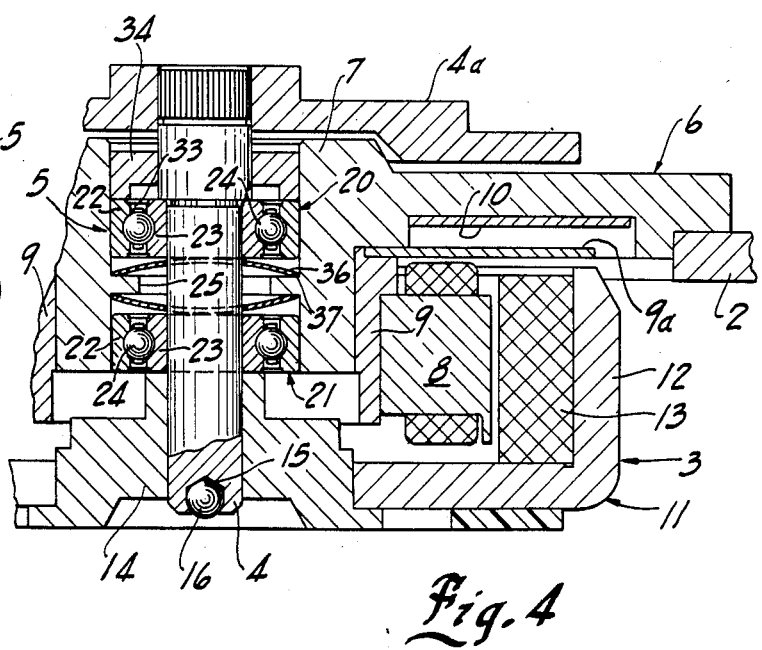

DRIVE MOTOR BEARING APPARATUS

BACKGROUND OF THE PRESENT INVENTION

The present invention relates to a cantilevered motor bearing apparatus and particularly to such a bearing apparatus for a permanent magnet motor such as used in computer disk drives.

The development of computer memories using rotating disks has created a demand for small, high speed drives which accurately rotate and position disk memories. Motors using a permanent magnet rotor in combination with multiple pole stator have been used in such drives. The rotor shaft is mounted within the stator by a suitable bearing structure, with the rotor secured to the outer end of motor shaft and defining a cantilevered bearing support. The disk drive is secured to the opposite end of the motor shaft. The bearing structure must provide accurate and long-life support for the cantilevered mounted rotor. Various sleeve and ball bearing structures have been suggested for use in permanent magnet motors for disk drives. In one ball-bearing unit, a pair of axially spaced high precision rotary ball bearings are secured within a machined hub of the stator structure. The outer race of each bearing is fitted within the hub. The outer race of a first bearing is bonded within the hub. The second bearing is held in the hub during assembly by a special O-ring member located within an annular recess in the hub. The inner races of the bearings are fitted onto the motor shaft and generally into abutting relation with a locating shoulder on the shaft and an outer hub member on the outer end of the shaft. A steel snap-ring or an integral spacer is interposed within a machined recess in the hub between the two bearings. Suitable flat spring washers are interposed between the snap ring and the respective opposed outer bearings of the two spaced bearings to resilently load the bearings and hold them in position with the desired accuracy and support.

Although the rotary ball bearings have been and presently are in use in commercially available motors, there is a continuing need to improve the operating characteristic of the bearings structure and to minimize the cost.

For example, in the multiple part bearing structure employing the holding O-ring, great care must be taken in the assembly. The inventor has realized that during the assembly of the outer bearing, the O-ring may be trapped between the inner edge of the O-ring recess and the outer race of the bearing. Insertion of the bearing may thus shear a part of the O-ring. Although the removed material may be minute, the material will be located with the bearing chamber within the hub. Any particle within the high precision bearing structure is completely unacceptable because it contributes to a production of bearing noise and may cause deterioration of the bearing. Further, if the material is trapped between the hub and the bearing race, the bearing race having a slight tilt which will also contribute to excessive noise if not bearing disruption. These results thus are unacceptable from a practial and competitive standpoint.

Thus, in such high speed, precision motors, the bearings are often a source of unacceptable noise. Spring loading, precision construction and the O-ring which may dampen noise have been used as necessary to minimize noise. However, the bearings which are commerically available and which the inventor has tested, create a noticable level of noise.

Various other alternative bearing structures can of course be use such as a more conventional sleeve type bearings with very special structures and the like. Such bearing structures however, also have certain disadvantages and difficulties.

There is a need therefore for an improved long-life and low-cost rotary ball bearing support for small permanent magnet motors such as used for disk drives and the like which produce a minimal level of noise.

SUMMARY OF THE PRESENT INVENTION

The present invention relates to a rotary bearing apparatus for a cantilevered rotor and particalarly to such an apparatus for a precision motors such as required for computer disk drive motors and the like. Generally in accordance with the teaching of the present invention, a pair of axially spaced rotary ball bearings are fixedly located within a bearing hub to the opposite sides of an integral spacer in the hub and preferably without the supporting O-ring or the like for supporting of the cantilevered rotor shaft. The bearing is specially constructed for insertion of the bearings from the opposite ends of the hub and with the integral spacer generally located centrally of the hub. Spring units are interopsed between the integral spacer and the bearing for properly locating the bearing and the shaft in the operating position and loading the bearing to minimize noise. The bearing structure is sealed and the bearings are sealed within a special commercially available grease which minimizes bearing noise as well as providing the necessary lubrication.

More particularly in the present invention, the bearing hub is specially formed of aluminum or other suitable material as a machined member having the smooth bearing opening extending inwardly from the opposite end to the integral spacer with the opening formed with a continuous smooth and uninterrupted surfaces.

The one bearing is assemblied with the shaft and inserted into the hub. The bearing fits rather freely within the hub and the outer race is adhesively bonded to the hub. The opposite bearing is pressed onto the shaft with a firm connection to the shaft and hub. The uninterrupted surfaces avoiding possible introduction of foreign matter into the bearing chamber as the result of inserting the outer bearing. Prior to the insertion, the spring means of appropriate size, dimension are located abutting the spacer. Generally, the spring resilently engages the opposed end of the bearing and loads the inner race of the bearing. The spring may be, in this invention, conventional coil springs, flat wave springs or any other suitable means which interacts between the spacer ledge and the inner bearing race. The springs are formed so as to avoid possible disruption of the hub metal and thereby avoid possible contamination of the rotary bearing unit or misalignment of the bearing. Each ball bearing is a high precision bearing having a precision outer race and a precision inner race with a retention and seal washer-like member on the opposite faces to seal the bearing. Each bearing is loaded with a noise reducing lubricant. The inventor has found that loading to 20 to 30 percent appears to produce optinium noise reduction.

The construction of this invention permits simple direct conventional machining of the hub structure and avoids the necessity of complicated automated machinery or manual insertion of the snap ring spacer or the like.

BRIEF DESCRIPTION OF THE DRAWINGS

The invention will be further understood by the following detailed description and the accompanying drawings. The drawings show as follows.

FIG. 1 is a side elevational view of a disk drive motor;

FIG. 2 is an enlarged vertical and axial section through the motor of FIG. 1;

FIG. 3 is an enlarged view of the bearing structure and

FIG. 4 is a fragmentary view of the bearing structure similar to FIG. 2 and illustrates an alternate embodiment.

DESCRIPTION OF THE ILLUSTRATED EMBODIMENT

Referring to the drawings and particularly to FIG. 1, a disk drive motor is illustrated including a stationary stator 1 fixedly mounted to a frame 2. A cup-shaped rotor 3 is carried by a shaft 4 and in cooperation with the stator 1 provides a power drive. A disk hub 4a is secured to the motor shaft 4 for coupling to a memory disk, not shown, such as presently used in the computer art. The rotor 3 is a permanent magnetic unit which in cooperation with the energization of the stator provides for appropiate high speed controlled movement of the rotor shaft and the interconnected disk hub 4a.

The rotor shaft 4 is specially mounted within the stator unit 1 by an improved bearing assembly 5 which particularly forms the subject matter of the present invention.

The stator and the rotor are generally constructed in accordance with known permenent magnet motor constructions and the interconnection of the shaft to the disk drive is similarly a more or less standard approach. Such components are thus only are generally described herein.

The stator 1 generally includes an end plate 6 defining a mounting member and having suitable mounting openings on the peripheral portion. The plate 6 includes a central bearing hub 7. The stator proper consist of a stator core and coil 8 encircling the hub. The stator core and coil assembly 8 is secured to a bushing 9 to locate the assembly in appropriate outwardly located spacement. A circuit board 9a is secured to the face of the end plate and preferably within a suitable recessed portion. A magnetic shield 10 is interdisposed between the printed board circuit and the end plate.

The rotor 3 is a generally cup-shaped member having the base 11 secured to the rotor shaft 4 and forming a continuous surface overlying the stator core and coil assembly 8. The flange or skirt 12 of the rotor 3 telescopes downwardly over the stator unit and terminates in spaced relation to the end plate 6 including the circuit board 9a secured thereto. An annular permanent magnet 13 is suitably secured within the skirt 12 so as to be in close spaced relation to the stator core and coil assembly 8 and provide for the desired motor action.

The motor shaft 4 extends through the stator unit 1. A rotor hub 14 is fixedly secured to the rotor end of the shaft 4 in any suitable matter. The rotor 3 is secured to an outer recessed portion of the hub 14 to firmly affix the rotor to the shaft. The outer end of the shaft 4 is recessed as at 15 to receive a supporting bearing ball 16 in accordance with conventional practice.

The opposite or disk end of the motor shaft 4 protrudes from the stator unit 1 and hub 7. The disk drive hub 4a is secured as by a knurled connection to the opposite end of the shaft, generally in accordance with the conventional practice.

As previously noted the stator, rotor and disk drive connection are in accordance with known and conventional practice. Further, such components may be of any desired construction and no further description thereof is given other than as necessary to fully explain and describe the illustrated embodiment of the bearing structure which particularly forms the subject matter of the present invention.

More particularly and as shown most clearly in FIGS. 2 and 3, the cylindrical bearing hub 7 of the stator unit 1 is an appropriate cylindrical portion integrally formed to the end plate 6 and projecting primarily forwardly from one face thereof. The cylindrical bearing hub 7 defines an opening within which the rotary bearing assembly 5 is secured to rotatably support the shaft 4 and thereby the rotor 3 and disk hub 4a.

The bearing assembly 5 consists of a pair of axially spaced rotary ball bearings 20 and 21, each of a commercially available construction. The bearings are high quality sealed precision ball bearings and each includes an outer race 22 and an inner race 23 with appropriate bearing balls 24 circumferentially distributed therein. The opposite side of the races 22-23 are sealed by end sealing washer-like members 24a. The bearings 20-21 are preloaded with a noise-deadening lubricant as more fully discussed hereinafter. For example, the inventor has used high precision ball bearings manufactured and sold by NMB Corporation, Model No. R1350 ZZ-RA5-P25. The precision bearings are formed with appropriately highly finished outer surfaces for precision, location and mounting of the bearings within a support and to a supported shaft. The bearings 20 and 21 are located within the hub in axially spaced relation to the opposite side of a center ledge 25. Spring units 26 and 27 are similarly interposed between the bearings and the ledge 25 to support the bearings and hold, load the inner races of the bearings 20-21 in the axially spaced relation. Such location of the bearings is generally known in the prior art systems for cantilevered motors. The particular method of mounting the bearings 20-21 and the support thereof in the proper location as shown in the illustrated embodiment has not been known or used prior to the present invention to the best of the inventor's knowledge.

More particularly, in the illustrated embodiment of the invention, opening in the hub 7 is formed with a machined finished surface with the ledge 25 formed as an integral part of the hub 7. The integral ledge 25 projects inwardly into the hub opening a distance substantially less than the diameter of the hub and generally as shown in the illustrated embodiment into alignment with the outer races of the spaced bearings. The ledge 25 thus defines finished cylinderical bearing chambers to the opposite side of the ledge with each chamber formed with a smooth, uninterrupted surface or wall for receiving the respective bearings 20-21. The bearing chambers have an axial length substantially greater than the axial dimension or depth of the bearings. The bearings are secured to the outer ends of chambers with the loading spring units 26 and 27 located between the ledge 25 and the bearings 20-21 to support the bearings.

Referring particularly to the outer most bearing 20, the bearing is assembled within the hub 7 generally centrally of the chamber with the spring unit 26 located between the ledge 25 and the adjacent end of the bearing. The outer race 22 of the bearing is located within the hub with a snug but non-interference fit. A close fit is desired to firmly hold the bearings 20-21 to the hub and eliminate rotation or other movement of the outer race 22. However, the bearing 20 is assembled without a conventional press fit because any extensive pressure might tend to distort the outer race slightly. Maintaining of the precision bearings without distortion is highly important in the present invention in order to eliminate and minimize any noise and to establish and maintain a long appropriate life. The inner race 23 of the bearing 20 is similarly secured to a finished portion of the rotor shaft 4 to rotate with the shaft. The inner race 23 of the bearing is axially supported by the spring unit 26.

In the illustrated embodiment of the invention, the spring unit 26 may include any suitable means but is preferably a spiral coil spring 30 acting between the ledge 25 and the inner race of the bearing 20.

The coil spring 30 is formed of a suitable spring material and is a spiral coil having a large end turn or loop 30a and an opposite small end turn or loop 30b. The large turn 30a of the coil spring 30 has a flat end face resting on the ledge 25. The opposite small-turn 30b of the coil 30 is located with a similar end face abutting the end face of the inner race 23 of the bearing 20 to transmit the spring force to the bearing.

The inner or opposite rotor bearing 21 is assembled by securing the bearing to the shaft 4. The outer race of bearing 21 fits freely within the opposite bearing opening or chamber in the hub 7 and is secured in place with a suitable adhesive. The rotor shaft 4 is provided with a shoulder for proper locating of the inner-bearing 20 on the shaft 4 for proper location and support within the hub. The spring unit 27 includes a coil spring and a thrust washer assembly is interposed between the spring and the inner race of bearing 21 to similarly provide appropriate support and loading of the rotary bearing 21.

Each bearing 20 and 21 is a sealed bearing structure and pre-loaded with a special noise reducing lubricant 33 which serves to not only provide long smooth operation of the bearing but functions to minimize generation or transmission of noise from the bearing. Such lubricants are known in the art. A particularly satisfactory lubricant is available from Wm. Nye, Inc. of New Bedford, Mass. under the models LG 20 and LG 39. The previously identified bearings of NMB Corporation were loaded at 20 to 30 percent capacity. This loading was sufficient to provide complete lubrication. The inventor has in fact discovered that excessive loading of the bearing may increase the noise level. Although the valve may change depending upon the particular bearing structure, with the usual precision bearing such as disclosed this general range appears satisfactory. In any given instance, the user of this invention can readily determine proper loading by simply trying of different loading percentages.

A suitable magnetic bearing seal 34 is secured within the hub 7 immediately outwardly of the inner-bearing 20 and in essence defines a sealed chamber. The seal 34 is any suitable seal such as presently used in motor applications and is inserted into the hub with a suitable interference fit to appropriately locate the seal without binding or distrotion of the bearing.

Each of the bearing chambers is thus formed as a continuous, uninterrupted machined surface at least coterminous width of the outer race of the aligned bearing. This permits the convenient and relatively inexpensive machining of the bearing hub to receive the bearings. The coil units 26-27 may be assembled within the bearing chambers, either manually or automatically and without any significant danger of interfering with or damaging the face of the hub. Similarly, the bearings are assemblied in the bearing chamber having the uninterrupted surfaces without creating foreign particles or distortion of the bearing mounting within the hub.

Thus, in assembly each spring assembly is located within the corresponding chamber and the bearing inserted into the hub. The outer bearing is pressed into the outer bearing chamber and the rotor shaft is then assembled with the inner bearings and inserted within the hub with the shouldered shaft locating the shaft for interconnection of the rotor disk hub.

The inventor discovered that the simple direct mounting of the bearings in the bearing chambers with the uninterrupted surfaces with the integral ledge significantly contributes to the economy of the production of the motor while maintaining high quality and long life support for the rotor. The present invention is thus particularly adapted to low cost, mass production of the motor. The total assembly can be automated with appropriate automated machinery for insertion of the several components.

The use of a coil spring further contributes to the automated assembly of the unit and the reduction of the cost of the unit. However, within the broadest aspects of the present invention, the spring means may of course be of a more conventional type of a wafer spring such as heretofore used. Such an embodiment is illustrated in FIG. 4 wherein like numbers are applied to all other elements. In the embodiment of FIG. 4, the coil spring has been replaced by a wafer spring 36 having an outer annular support portion 37 abutting the ledge 25 and springing outwardly into engagement with a abutting inner race 23 of the bearing. Such an assembly uses a substantially conventional wafer spring. The motor of FIG. 4 will thus operate in the same manner as the first embodiment and a provide a long, silent operating life of the motor drive.

Various modes of carrying out the invention are contemplated as being within the scope of the following claims particularly pointing out and distinctly claiming the subject matter which is regarded as the invention.

I claim:

1. A cantilevered permanent magnet motor, comprising a stationary stator including a mounting plate having a central bearing hub, said hub being a tubular opening at the opposite ends, said hub having bearing chambers at the opposite ends and each chamber, said chambers including a chamber wall extending inwardly from the open end of said hub, said chamber wall having smooth and uninterrupted surfaces, first and second rotary ball bearing units one each in each of said chambers and secured in close fitting engagement with said chamber walls and having means extended between said smooth and uninterrupted walls of said bearing chambers and the outer surfaces of said bearing units to fixedly secure said bearing units to said hub, said smooth and uninterrupted walls extending inwardly from said bearing units, a rotor shaft journalled in said bearing units and projecting outwardly from the opposite ends thereof,
a rotor secured to one end of said shaft,
a mounting member secured to the opposite end of said shaft,
said hub having a central ledge, and
first and second spring means interposed one each between said ledge and said first and second bearing units.

2. A cantilevered permanent magnet motor, comprising
a stationary stator including a mounting plate having a central bearing hub, said hub being a tubular opening at the opposite ends and said opening defining a smooth bearing opening,
said hub having bearing chambers at the opposite ends and each chamber including a smooth and uninterrupted chamber wall extending inwardly from the open end of said hub, said chamber wall being smooth and uninterrupted,
first and second rotary ball bearing units one each in each of said chambers and secured in close fitting engagement with said chamber walls and having means extended between said smooth and uninterrupted walls of said bearing chambers and the outer surfaces of said bearing units to fixedly secure said bearing units to said hub, said smooth and uninterrupted walls extending inwardly from said bearing units,
a rotor shaft journalled in said bearing units and projecting outwardly from the opposite ends thereof,
a rotor secured to one end of said shaft,
a mounting member secured to the opposite end of said shaft,
said hub having a central ledge, and
first and second spring means interposed one each between said ledge and said first and second bearing units,
each of said bearing units includes an inner race and an outer race and each of said spring means is a spiral coil spring having a large turn abutting said ledge and a small turn abutting the inner race of the corresponding bearing unit.

3. A disk drive motor comprising an end plate having means for fixedly mounting the plate and having a circuit board unit secured to the face of the end plate and having a central cylindrical bearing hub extending outwardly of the circuit board unit from said end plate,
a stator secured to said end plate and the exterior of said hub,
a cup-shaped rotor overlying said hub and stator and having a rotor shaft extending through said hub and terminating in an outer end,
a disk hub secured to the outer end of said rotor shaft,
said bearing hub including a centrally located integral ledge projecting inwardly into the hub opening and having corresponding cylindrical smooth and uninterrupted surfaces extending axially from said ledge and defining an inner bearing chamber adjacent the disk hub and an outer bearing chamber adjacent said rotor,
a first precision rotary bearing located in said inner bearing chamber and having an outer race secured to the finished surface with an adhesive in spaced relation to said ledge and an inner race secured to the shaft with an interference fit,
a second precision rotary bearing located in said outer bearing chamber and having an outer race located in the chamber with a snug fit in spaced relation to said ledge and an inner race secured to the shaft with an interference fit,
a first spring unit located between said ledge and said second precision rotary bearing,
a second spring unit located between said ledge and said second precision rotary bearing,
a bearing seal within said hub between said first rotary bearing and said disk hub, and
each of said bearings including a noise deadening grease to lubricate said bearings and to reduce operational noise of said bearings and being a sealed rotary bearing to retain said noise deadening grease.

* * * * *